Nov. 29, 1966  W. J. BERNARD  3,289,059
DRY FILM CAPACITOR
Filed May 5, 1965
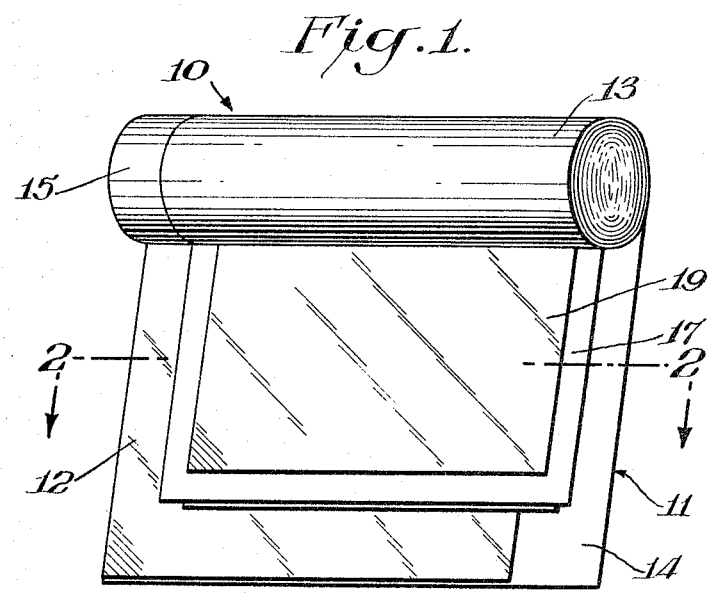
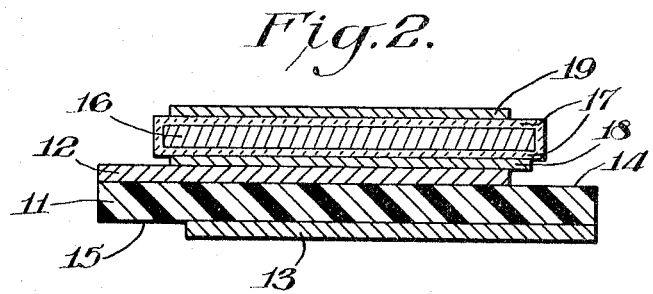
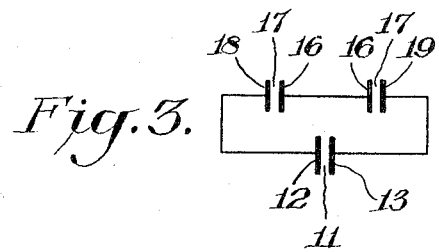
INVENTOR
*Walter J. Bernard*
BY *Connolly and Hutz*
ATTORNEYS United States Patent Office 3,289,059
Patented Nov. 29, 1966

3,289,059
DRY FILM CAPACITOR
Walter J. Bernard, Williamstown, Mass., assignor to Sprague Electric Company, North Adams, Mass., a corporation of Massachusetts
Filed May 5, 1965, Ser. No. 453,417
3 Claims. (Cl. 317—258)

This invention relates to a unique combination of capacitors and more particularly to a combination of convolutely wound capacitors utilizing an oxide film as its dielectric.

The dry film capacitor known to the art is a capacitor in which a valve-metal is provided with an oxide dielectric by conventional anodization means and is then provided with a thin adherent counterelectrode that is applied directly to the oxide film by various deposition means known to the metallized capacitor art. Such a capacitor provides the high capacitance-volume ratio of the electrolytic capacitor art, and the self-healing or self-clearing, electrolyte-free qualities of the electrostatic capacitor art.

A major obstacle to widespread use of the dry film capacitor relates to the difficulties that the prior art has encountered in terminating the capacitor, particularly in making a usable contact to the deposited counterelectrode. In order to enjoy the self-healing feature of the metallized capacitor art, the counter-electrode of a dry film capacitor must be terminated by a film that is itself self-clearing, and yet at the same time be sufficiently rugged to permit the attachment of a terminal. Various methods which have been practiced in terminating prior art dry film capacitors include: the utilization of gold leaf, deposited carbon or silver paste, over the counterelectrode as a base for the attachment of a terminal. None of these relatively costly prior art terminations has been completely successful in providing self-clearing without damaging the oxide dielectric, and none has permitted the attainment of a convolutely wound capacitor.

It is an object of this invention to overcome the foregoing and related disadvantages of the prior art.

It is another object of this invention to provide a dry film capacitor having a termination that maintains the self-healing properties of the capacitor in a convolutely wound structure.

It is a further object of this invention to provide a ruggedly terminated dry film capacitor that is less expensive than the prior art devices.

These and other objects of this invention will become apparent upon consideration of the specification in conjunction with the accompanying drawing, in which:

FIGURE 1 is a perspective view of a partially unrolled unit of the present invention;

FIGURE 2 is a section taken along line 2—2 of FIGURE 1, and

FIGURE 3 is a schematic of the capacitors of FIGURE 1.

In accordance with the foregoing objects, the component of the present invention comprises a dielectric film metallized on both sides thereof. This is convolutely wound with a valve metal foil which has a dielectric compound of the same valve metal coated on opposite sides thereof and a pair of electrodes positioned on the dielectric coated surfaces. The foil, dielectric coated surfaces, electrodes and metallized film arrangement define a pair of series-connected capacitors.

Referring to the drawing, capacitance section 10 comprises a dielectric plastic film 11 having metallized layers 12 and 13 disposed thereon. Unmetallized margins 14 and 15 are provided for on opposite sides of the metallized film. This arrangement is convolutely wound with an aluminum foil 16 which carriers aluminum oxide layer 17 and electrodes 18 and 19 on opposite sides thereof.

It will be noted that there is no provision for attaching a lead to aluminum foil 16. Foil 16 remains in effect completely isolated. This arrangement defines a pair of capacitors connected in series. One capacitor is electrode 18 and foil 16 separated by aluminum oxide film 17, the other capacitor is electrode 19 and foil 16 separated by aluminum oxide film 17. Aluminum foil 16 is the common electrode, series connecting the two capacitors.

There is a third capacitor in the unit although it actually adds little capacitance-wise to the component. Note that the dielectric plastic film 11, metallized on opposite sides with metal layers 12 and 13, is a capacitor having a finite capacitance. The function of the metallized film, however, is not to contribute capacitance to the unit but to insulate electrodes 18 and 19 from one another when the unit is convlutely wound as in FIGURE 1 and also to provide termination means for the unit. Thus, FIGURE 3 shows a schematic of a pair of series-connected capacitors in parallel with the metallized plastic film.

An advantage of the present construction, as regards A.C. applications, is that the voltage divides approximately equally and thus the capacitor can be operated at a substantially higher (approaching two times) voltage, as compared with a single dielectric. An advantage as regards D.C. applications is that even if the voltage gradient is non-linear, the maximum gradient is substantially less than with the use of a single dielectric of twice the thickness.

The capacitor is prepared by anodizing a length of aluminum foil on both sides. Applying electrodes of metal, or a combination of metal and graphite, to both sides of the formed foil. A dielectric film, metallized on both sides, is placed in face to face contact with the electroded-anodized aluminum foil. This arrangement is then convolutely rolled into a compact capacitance section which is packaged in a suitable protective container, e.g., a metal can, a plastic case, etc. In a preferred embodiment, the metallized film has unmetallized marginal strips on opposite sides thereof, so as to minimize flash-over and to facilitate termination of the units. In this embodiment, the dielectric film is advantageously wider than the series-connected capacitors so as to protrude out each end of the unit in extended foil fashion, to facilitate termination.

While aluminum foil has been employed for purposes of illustration, it is to be understood that any valve metal is operable, for example, tantalum, titanium, zirconium, niobium, etc. The foil may be worked or surface modified, in any manner designed to increase the surface area thereof. The electrodes may consist of any of the commonly used electrode materials known to the art.

The dielectric film, which is metallized, may be of paper or a plastic such as polyethylene terephthalate, polycarbonate, Teflon, etc. The metal film thereon may be aluminum, nickel, zinc, etc.

Since is it obvious that many changes and modifications can be made in the above-described details without departing from the nature and spirit of the invention, it is to be understood that the invention is not limited to said details except as set forth in the appended claims.

What is claimed is:

1. An electrical component comprising an organic dielectric film having separated metallized layers on both sides thereof, convolutely wound with a valve metal foil which has a dielectric compound of the same valve metal coated on opposite sides thereof and a pair of electrodes positioned on the dielectric coated surfaces, said metallized layers being in face to face contact with said electrodes; said foil, dielectric coated surfaces, electrodes and metallized film arrangement defining a pair of series-connected capacitors in parallel with the metallized film.

2. An electrical component comprising an organic film having separated metallized layers on both sides thereof, convolutely wound with a valve metal foil which has a dielectric oxide formed on opposite sides thereof and a pair of electrodes positioned on the oxide surfaces, said metallized layers being in face to face contact with said electrodes; said foil, oxide surfaces, electrodes and metallized film arrangement defining a pair of series connected capacitors in parallel with the metallized film.

3. The component of claim 2 wherein said metallized dielectric film is wider than said series-connected capacitors so as to protrude out each end of the unit in extended foil fashion to facilitate termination.

References Cited by the Examiner

UNITED STATES PATENTS

| 2,088,949 | 8/1957 | Fekete | 317—258 |
| 3,149,399 | 9/1964 | Sprague et al. | 317—258 X |

FOREIGN PATENTS 768,998  2/1957  Great Britain.

OTHER REFERENCES

Knoblauch, German printed application No. 1,001,419.

LEWIS H. MYERS, *Primary Examiner.*

JOHN F. BURNS, LARAMIE E. ASKIN, *Examiners.*

D. J. BADER, E. GOLDBERG, *Assistant Examiners.*